United States Patent [19]

Gellert

[11] Patent Number: 4,892,474
[45] Date of Patent: Jan. 9, 1990

[54] PROFILED PLATE HEATERS FOR INJECTION MOLDING NOZZLES

[76] Inventor: Jobst U. Gellert, 7A Prince Street, Georgetown, Ontario, Canada, L7G 2X1

[21] Appl. No.: 312,467

[22] Filed: Feb. 21, 1989

[51] Int. Cl.$^4$ .................. B29C 45/20; B29C 45/72
[52] U.S. Cl. .................................. 425/549; 29/611; 264/328.15; 425/562; 425/563; 425/564; 425/566
[58] Field of Search ............... 425/547, 548, 549, 562, 425/563, 564, 566, 570; 264/328.15, 328.9, 328.8, 297.1, 297.2; 29/611

[56] References Cited
U.S. PATENT DOCUMENTS
4,795,337  1/1989  Gellert .................. 425/549

Primary Examiner—Jay H. Woo
Assistant Examiner—Timothy W. Heitbrink
Attorney, Agent, or Firm—Riches, McKenzie & Herbert

[57] ABSTRACT

Injection molding nozzle having electric plate heaters mounted thereon. Insulative air spaces are provided according to a predetermined size, shape and pattern between the outer surfaces of the nozzle and the abutting inner surface of each heater. This provides heat transfer from the heaters to the nozzle according to a desired profile along the melt flow passage through the nozzle, depending upon the system configuration and the application.

6 Claims, 4 Drawing Sheets

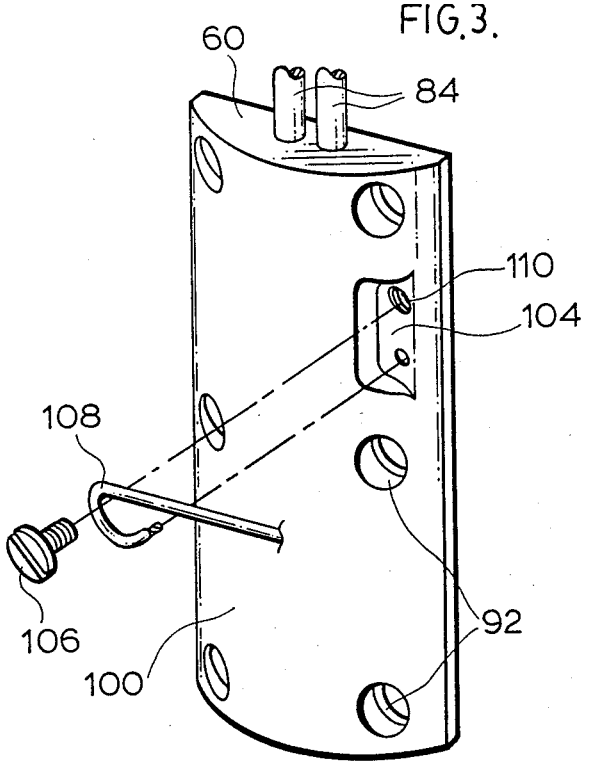
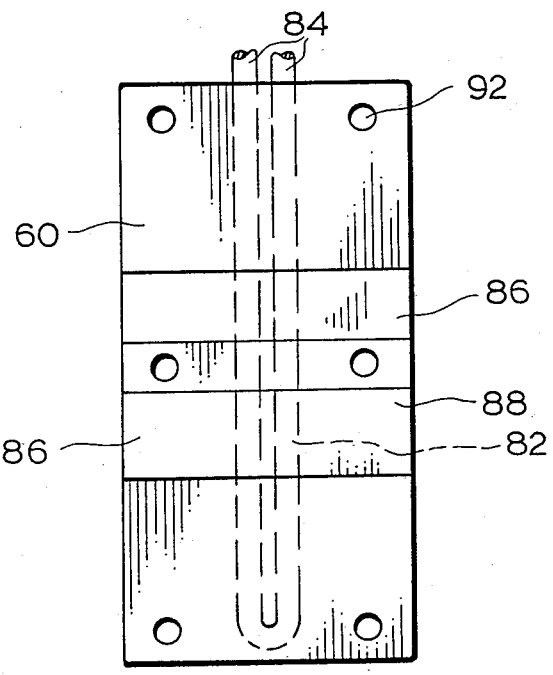
FIG.3.
FIG.4.

PROFILED PLATE HEATERS FOR INJECTION MOLDING NOZZLES

BACKGROUND OF THE INVENTION

This invention relates generally to injection molding and more particularly to a nozzle having electric slab or plate heaters which provide heat according to a predetermined profile.

Plate heaters are well known in the injection molding field, but recently most nozzles are made with a helical heating element extending around the central melt bore. For instance, the applicant's U.S. Pat. No. 4,795,337 which issued Jan. 3, 1989 discloses a nozzle in which an electric heating element is integrally brazed in a spiral channel extending around the central melt bore. One of the advantages of helical heating elements over these previous plate heaters for nozzles has been that the heat can be distributed over the length of the nozzle according to a predetermined profile by spacing the coils of the heating element as required.

SUMMARY OF THE INVENTION

Accordingly, it is an object of the invention to at least partially overcome the problems of the prior art by providing a nozzle with a plate heater which provides for distribution of heat transfer according to a desired profile.

To this end, in one of its aspects, the invention provides an injection molding nozzle having an elongated injection molding heated nozzle having a central portion extending between a rear portion adjacent a rear end and a forward portion adjacent a forward end, and a melt bore extending therethrough from the rear end to the forward end, the improvement wherein the central portion of the nozzle has at least one outer face which receives an electric plate heater securely mounted thereagainst, the heater having an inner face which abuts against the outer face of the central portion of the nozzle, the inner face of the plate heater and the outer face of the central portion of the nozzle being shaped to define at least one insulative air space therebetween having a configuration to provide heat flow from the plate heater to the nozzle according to a predetermined profile.

Further objects and advantages of the invention will appear from the following description, taken together with the accompanying drawings.

BRIEF DESCRIPTION OF THE DRAWINGS

FIG. 3 is an isometric view of one of the plate heaters seen in FIG. 1;

FIG. 4 is an elevation view of the other side of the plate heater showing the channels.

DETAILED DESCRIPTION OF THE DRAWINGS

Figure 1:
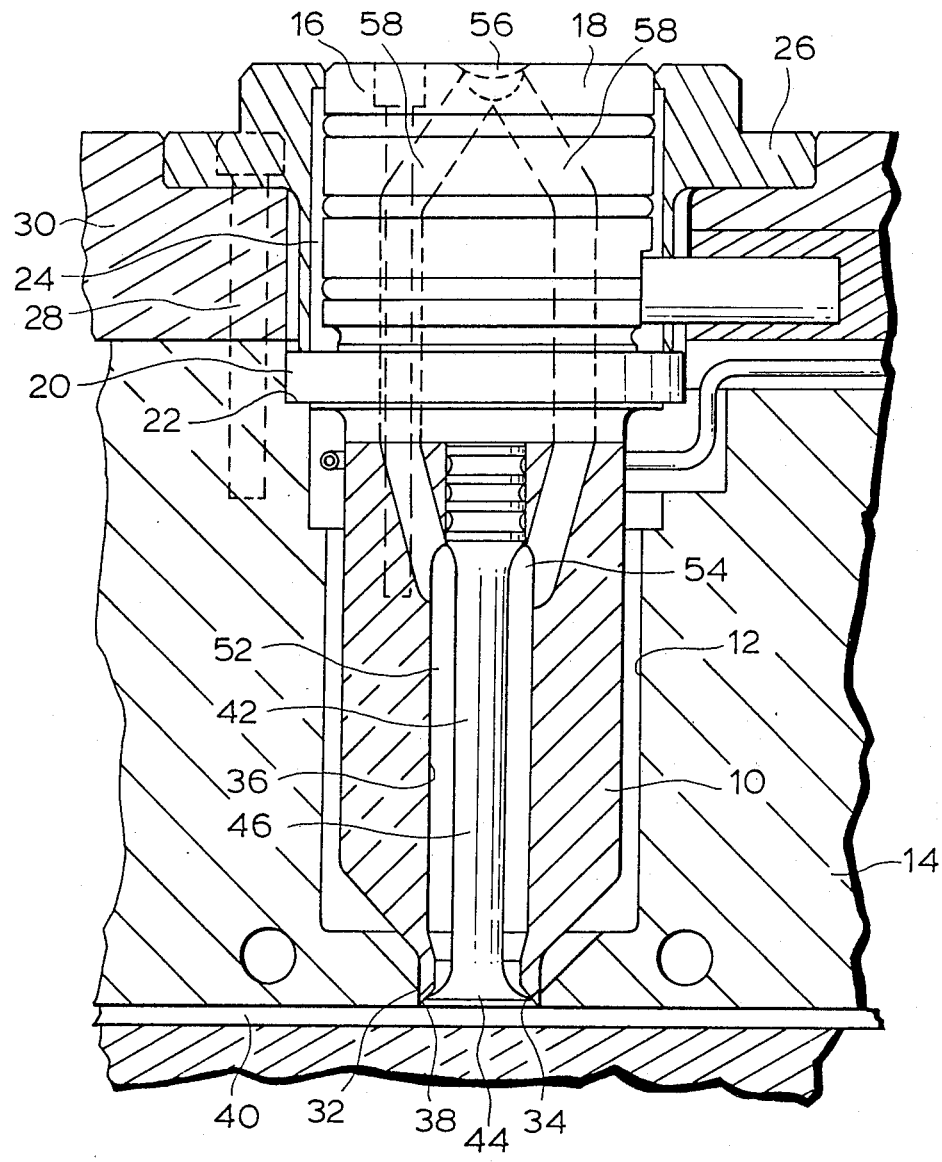
FIG. 1 is a sectional view of a portion of an injection molding system having a nozzle according to a preferred embodiment of the invention.

Reference is first made to FIG. 1 which shows a nozzle 10 according to a preferred embodiment of the invention received in a well 12 in a cavity plate 14. The nozzle 10 is secured by bolts 16 to a manifold 18. The manifold 18 has a locating flange 20 which is seated against a circumferential shoulder 22 of the cavity plate 14 to provide an insulative air space 24 between the heated nozzle 10 and the cooled cavity plate 14. The locating flange is secured by a locating collar 26 which is fastened in place by bolts 28 which extend through a back plate 30 into the cavity plate 14. The nozzle 10 is also located laterally by a forward nose portion 32 being received in a matching cylindrical opening 34 through the cavity plate 14.

The nozzle 10 has a central bore 36 which extends into the nose portion 32 to form a gate 38 leading to a cavity 40. An elongated valve member 42 is received in the central bore 36 with an enlarged forward end 44 which seats in the gate 38 in the retracted closed position. The valve member 42 has a forward portion 46 which extends through the central bore 36 of the nozzle 10 and a rear portion 48 which extends into an opening 50 in the manifold 18. The forward portion 46 of the valve member 42 is smaller in diameter than the surrounding portion of the central bore 36 to provide a melt flow space 52 between them. A melt flow passage 54 extends to convey pressurized melt from a central inlet 56 in the manifold 18 to the gate 38. The melt passage splits into two branches 58 which extend around the opening 50 in the manifold and join the space 52 around the valve member 42 in the central bore 36. When the injection pressure of the melt forces the valve member 42 to the forward open position, melt flows through the gate 38 outwardly around the enlarged forward end 44 of the valve member 42 into the cavity 40.

Figure 2:
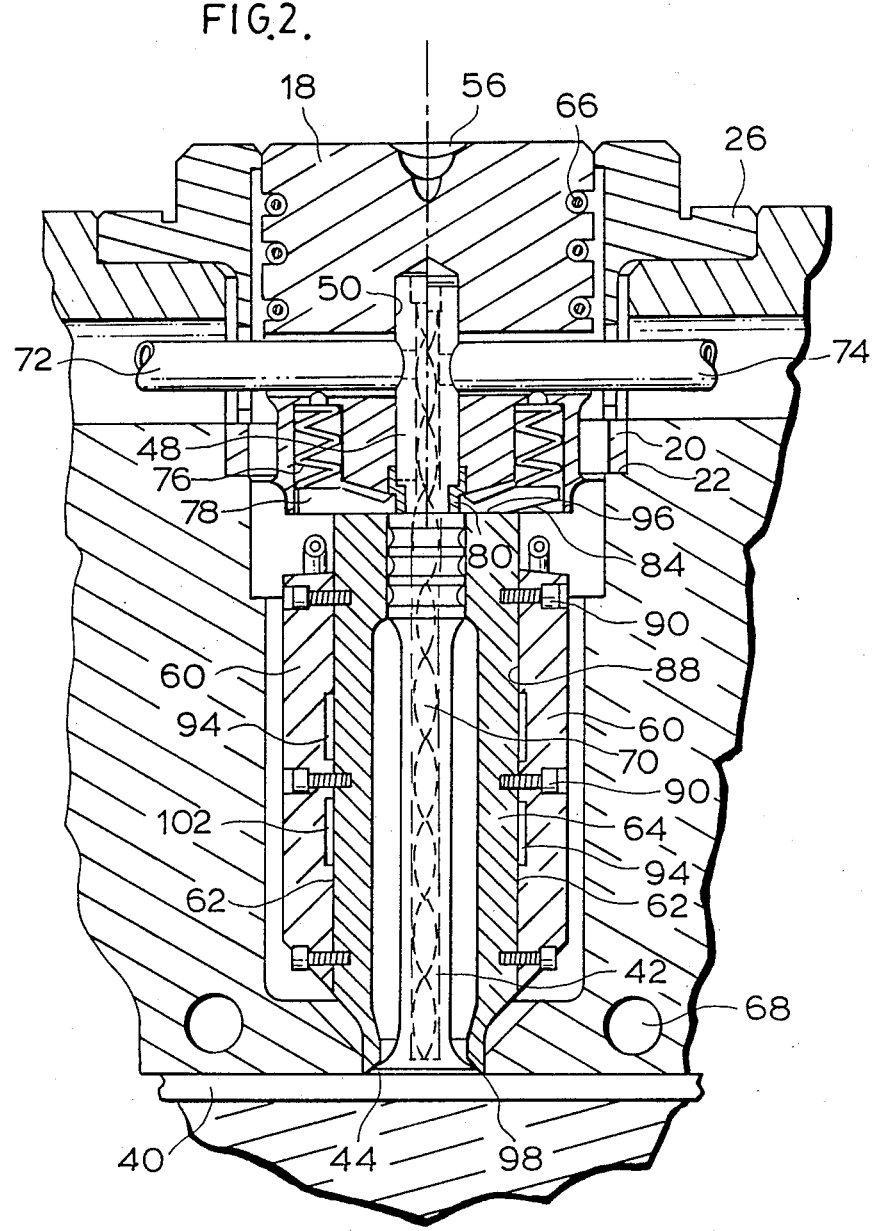
FIG. 2 is a split sectional view at a right angle to FIG. 1 showing the valve member brasing mechanism.

In this embodiment, as seen in FIG. 2, the nozzle 10 is heated by two slab-shaped electric plate heaters 60 according to the invention which are described in more detail below. The plate heaters 60 are secured against diametric flat outer faces 62 of the central portion 64 of the nozzle 10. The manifold is heated by an electrical heating element 66 which is integrally cast into it. The cavity plate 14 is cooled by pumping cooling water through cooling conduits 68. In this large volume application, it is desirable to provide more cooling to the enlarged forward end 44 of the valve member 42 which extends to the cavity 40. Thus, a twisted partition 70 is mounted in the hollow valve member 42, and a circulation of cooling water is provided between inlet and outlet pipes 72, 74 which extend laterally from the rear portion 48 of the valve member 42 through lateral openings in the manifold 18. Thus, cooling water flows into the valve member 42 through the inlet pipe 72, forward along one side of the twisted partition 70 to the enlarged forward end 44 where it crosses over and flows rearwardly along the other side of the twisted partition and back out through outlet pipe 74.

In this application, the valve member 42 is biased towards the retracted closed position by a pair of biasing mechanisms located on opposite sides of the opening 50 in the manifold 18. As described in detail in the applicant's Canadian patent application Ser. No. 587,417 filed Jan. 3, 1989 entitled "Injection Molding System Having Offset Valve Pin Biasing Mechanisms" each mechanism includes a coiled compression spring 76 which is seated in the manifold 18 to pivot a lever member 78 which engages the valve member 42 through a split ring 80.

Each slab-shaped plate heater 60 is cast of a copper alloy and has an electrically insulated heating element 82 extending from terminals 84. As seen in FIG. 4, each heater 60 has channels 86 machined in a flat inner face 88. When the heater 60 is fastened to one of the flat faces 62 of the nozzle 10 by bolts 90 which extend through holes 92, the channels 86 form insulative air spaces 94 between the inner face 88 of the heater and the outer face 62 of the nozzle. In this embodiment, the channels 86 are larger in the middle of the heater 60 because less heat is required in that area due to greater heat loss near the rear and forward ends 96,98 of the nozzle. However, the channels can be made in a variety of sizes, shapes and patterns to provide heat flow from the plate heater 60 to the nozzle 10 according to a predetermined profile along the central bore 36 depending upon the system configuration and the application. Each plate heater 60 also has a curved outer surface 100 so that the central portion 64 of the nozzle 10 with the heaters 60 in place has a generally cylindrical outer surface 102. In this embodiment, each of the plate heaters 60 has a cutout 104 to receive a screw 106 to hold a thermocouple 108 in place in a hole 110.

In use, the system is assembled as shown and electrical power is applied to the terminals 84 of the plate heaters 60 and the terminal (not shown) of the heating element 66 to heat the nozzle and manifold 14 to a predetermined operating temperature. Pressurized melt from a molding machine (not shown) is introduced into a melt passage 54 through the central inlet 56 according to a predetermined cycle. When injection pressure is applied, the force of the melt on the enlarged forward end 44 of the valve member overcomes the spring force and drives the valve member 42 forward to the open position. The melt then flows through the melt passage 54 and the gate 38 until the cavity 40 is filled. Injection pressure is held momentarily to pack and then released. When the injection pressure is released, the force of the springs 76 pivots the lever members 78 and drives the valve member 42 to the retracted closed position in which the enlarged forward end 44 is seated in the matching gate 38. After a short cooling period, the mold is opened to eject the molded products. After ejection the mold is closed, injection pressure is reapplied which reopens the gate 38. This cycle is repeated continuously with a frequency dependent upon the size of the cavity and the type of material being molded. As it is well known, it is desirable that the melt remain at a constant temperature as it flows through the melt passage 54 until it reaches the gate 38. Using the plate heaters 60 which provide the insulative air spaces 94 greatly facilitates this in the nozzle 10 because the pattern or profile of heat flow to the nozzle can be designed to suit the requirements of the system.

Figure 5:
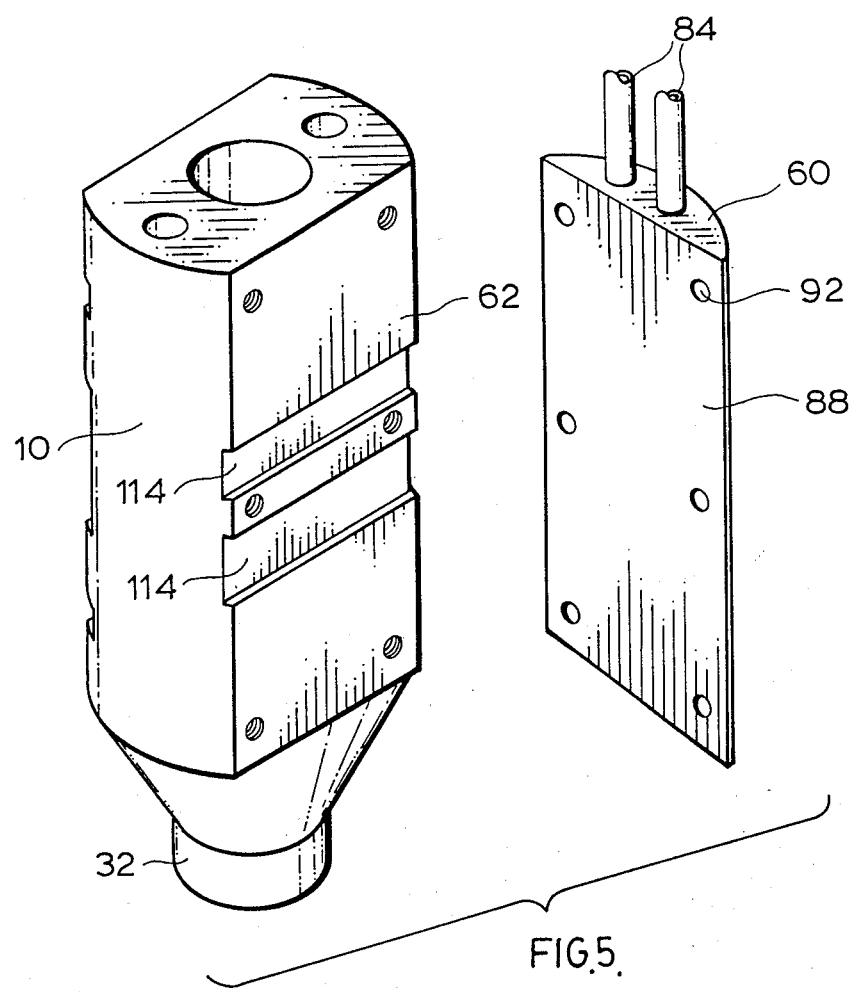
FIG. 5 is a view of a nozzle according to another embodiment of the invention with one of the plate heaters removed to show the channels.

The embodiment of the invention shown in FIG. 5 is very similar except that channels 114 are provided in the outer faces 62 of the nozzle 10 rather than the inner faces 88 of the plate heaters 60. However, when the plate heaters 60 are mounted on the nozzle 10, insulative air spaces are formed between the faces according to the predetermined pattern. Otherwise, the description of this embodiment and its use are the same as that given above and need not be repeated.

While the description of the nozzle 10 and the plate heaters 60 have been given with respect to preferred embodiments, it is not to be construed in a limiting sense. Variations and modifications will occur to those skilled in the art. For instance, it is apparent that the nozzle 10 and the plate heaters 60 can have different shapes and configurations depending upon the type of application, and that there can be a different number of heaters 60. Reference is made to the appended claims for a definition of the invention.

What I claim is:

1. In an elongated injection molding heated nozzle having a central portion extending between a rear portion adjacent a rear end and a forward portion adjacent a forward end, and a melt bore extending therethrough from the rear end to the forward end, the improvement wherein:
    the central portion of the nozzle has at least one outer face which receives an electric plate heater securely mounted thereagainst, the plate heater having an inner face which abuts against said at least one outer face of the central portion of the nozzle, the inner face of the plate heater and said at least one outer face of the central portion of the nozzle being shaped to define at least one insulative air space therebetween having a configuration to provide heat flow from the plate heater to the nozzle according to a predetermined profile.

2. An injection molding nozzle as claimed in claim 1 wherein the nozzle has a pair of diametrically located plate heaters.

3. An injection molding nozzle as claimed in claim 2 wherein the inner face of each plate heater and said at least one outer face of the central portion of the nozzle are generally flat, the inner face of each plate heater having at least one channel therein to form said at least one insulative air space.

4. An injection molding nozzle as claimed in claim 2 wherein the inner face of each plate heater and said at least one outer face of the central portion of the nozzle are generally flat, each outer face of the central portion of the nozzle having at least one channel therein to form said at least one insulative air space.

5. An injection molding nozzle as claimed in claim 3 wherein the plate heaters are generally slab-shaped to provide the central portion of the nozzle with the plate heaters mounted thereon with a generally cylindrical outer surface.

6. An injection molding nozzle as claimed in claim 4 wherein the plate heaters are generally slab-shaped to provide the central portion of the nozzle with the plate heaters mounted thereon with a generally cylindrical outer surface.

* * * * *